Oct. 1, 1929.　　　A. C. FISCHER　　　1,730,065
APPARATUS FOR MANUFACTURE OF SHEET SURFACING MATERIALS
Filed Sept. 20, 1920　　　7 Sheets-Sheet 1

INVENTOR
Albert C. Fischer
BY
Wilkinson, Huxley, Byron & Knight
ATTORNEYS Oct. 1, 1929.  A. C. FISCHER  1,730,065
APPARATUS FOR MANUFACTURE OF SHEET SURFACING MATERIALS
Filed Sept. 20, 1920  7 Sheets-Sheet 4

INVENTOR
Albert C. Fischer
BY
Wilkinson, Hurley, Byron Knight
ATTORNEYS.

Oct. 1, 1929.  A. C. FISCHER  1,730,065
APPARATUS FOR MANUFACTURE OF SHEET SURFACING MATERIALS
Filed Sept. 20, 1920  7 Sheets-Sheet 6

INVENTOR
Albert C. Fischer,
BY
Wilkinson, Huxley, Byron & Knight
ATTORNEYS.

Patented Oct. 1, 1929

1,730,065

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

APPARATUS FOR MANUFACTURE OF SHEET SURFACING MATERIALS

Application filed September 20, 1920. Serial No. 411,629.

It has been customary heretofore in the manufacture of composition roofings to produce the same in the form of smooth surfaced roofings, grit roofings having a plain uniform color, grit surfaced roofings with designs stamped, formed, impregnated or stenciled thereon, and hand types wherein a molded substance, pressed into form and coated, was fed onto an under sheet to form thereon an adhesive coating with a uniform surface.

Such roofings as above described, especially in larger cities, in the course of a year or two become soiled and dirty, with the result that the design or color gives place to a dirty gray or black cast and is no longer distinguishable from any roof made of cheaper material.

The primary object of this invention is to prepare roofing material, wallboard, and the like, in bas relief, as, for instance, by stenciling a design thereon with materials such as grit or other suitable substance that stands out in relief, so that regardless of where the roofing is used, and whether or not the surface becomes soiled and dirty, the outline of the relief will still be distinguishable and the design visible to the eye.

This invention is not limited to any particular design or method of preparation of the roofing, i. e. the manner of placing the grit on the overlying sheet; on the contrary, the grit may be placed either after the overlying sheet has been impressed upon the underlying sheet or before the overlying sheet has been severed and fed onto the underlying sheet.

In preparing grit surfaced roofing with the stenciled design the present invention differs from numerous processes heretofore developed, in that it is less complicated and does not require the introduction of steps in the operation in addition to those required for the preparation of ordinary smooth surfaced roofing without design.

Another object of the invention is to perfect the designs to be produced through coating presses, by placing, in various manners, the cut designs or pieces on an underlying sheet, cementing them thereto and forming a design in bas relief. These sheets may be prepared as a whole and marketed in such condition, or may be cut up into component parts or individual shingles, the sizes of the sheets depending upon the uses to which the completed material is to be put.

Another purpose of the invention is to utilize foundation sheets and overlying sheets as now prepared for the market without the necessity of changing over machinery heretofore used for saturating and coating roofing material, and by leaving off the upper or lower coating, join two sheets together in such a manner as to form a single product. In this manner the use of grit-surfaced material will be reduced, and lighter weight underlying materials can be used; all of which considerations make for economy in the roofing industry.

Heretofore it has required from 2¼ to 2¾ squares of slate surface roofing to cover 100 square feet in many of the roofings. Under the present invention, little more than 1¼ squares of the slate-surfaced material is needed when used in combination with an underlying sheet of plain surfaced material.

The present invention also provides for separation or spacing of the parts of the overlying section in such manner that when the surface of the roof, as stated before, becomes dirty the sharp outline of the design will still be visible to the eye and make a decorative roof.

A further object of this invention is to limit adhesion of the overlying material to certain restricted portions of the underlying sheet. This is done by spreading the cementing coat prior to laying on the overlying material in such a manner that certain spaces only are covered, and then feeding the pressed sheet over slitting knives which penetrate to the base of the overlying sheet but do not pass beyond, and thus permit these severed parts of the upper sheet, which do not have the cementing material beneath them, to separate from the lower sheet and leave the other parts of the upper sheet to remain in spaced relation to each other and in offset or bas-relief relation to the lower foundation sheet. The overylying sheets may be cut or slit into shingles or slabs of any suitable length.

Another feature of the present invention consists in so slitting or cutting the overlying sheet that a free margin will be left upon one edge or in between the slabs or pieces effecting the design so as to permit the overlapping of the sheets.

The present invention proceeds by forming a foundation sheet in the usual manner, then, as the upper coating of this foundation sheet is applied, and while it is still in a heated state, pressing thereon another piece or sheet of the material, either in the same state or in a decorative state, and then running the superposed under and over layers through pressing rollers and thoroughly joining them together, thereby forming sheets of roofing or wallboard in bas relief.

The upper finishing sheet may be cut into slabs, designs, shingles, or stencils and fed through various receptacles and distributors to the foundation sheet, which is then fed through pressing rollers and joined thereto. In this manner, if any of the grit surface has been pressed through the upper fabric in applying the latter to a foundation sheet, the roofing is not injured since the lower sheet is entirely waterproof, and saved from injury which might result in applying grit in ordinary process of manufacture.

It can be readily understood that several different stencils may be fed one after another and built up upon the under fabric. As many as three or four fabrics may be run through cutters, and the cut portions of one fabric run into the vacant spaces between the cut portions of another fabric, thus forming a patterned overlay on the foundation sheet. This has the advantage of enabling the manufacturer to use different materials, and by joining them together to obtain various colors and designs, which heretofore has not been possible.

It is to be understood that while the designs referred to will stand out in bas relief when on the roof surface, their elevation above the foundation sheet, which is thoroughly waterproof, will not be sufficient to retard the flow of water to any substantial extent. The material which serves to develop the bas relief design upon the lower sheet is roofing material which is fully prepared, with the exception of the finishing surface, and this may be fully prepared before being applied to the foundation sheet, and the regular machine which has heretofore been used can be employed for producing both the foundation sheet and the sheets from which are cut the overlying parts which form the bas relief; the variation in the preparation of the two sheets being in omitting the undercoating of the overlying sheet and the upper grit surface of the underlying sheet. In this manner, in the case of grit-surfaced roofing, the undercoating of the overlying sheet is saved, as also the talc, grit, or soapstone surface of a portion or all of the underlying sheet, according to the design.

It will be readily understood that a foundation sheet of great width may be used, and a single upper sheet may be cut into two different sections, and so separated or spaced upon the wide lower sheet that the lower sheet can be cut into two, and sheets of two separate designs formed. Or two separate sheets may be superposed and fed through cutters, and the resultant forms separated so that there will be four stenciled designs; and these designs may then be so assembled, by suitably arranging the feed rollers, that a stencil design of the lower sheet will interweave with a stencil design of the upper sheet, and the two designs thus formed may be in turn united to the foundation sheet, but in spaced relation thereon so that two separate designs of inlaid roofing will be formed on the foundation sheet.

From the foregoing it will be readily seen that ordinary composition roofing material which heretofore has been found unavailable for ornamental uses because of its plainness, and the use of which has been mainly limited to barns, sheds, etc., by being manufactured in bas-relief can readily be made available for higher class structures; and what is true of the roofing sheets is also true of wallboard for interior decoration, which can be formed in much the same manner.

Further features of the present invention relate to a machine for performing the various functions involved in attaining the several results herein described.

The description of the device may be prefaced with a short statement of the functions of the apparatus.

Means may be provided for receiving sheets of building material from rolls or saturated vats, feeding them, including the foundation sheet, to cutting rolls. A novel arrangement of combined sander and surface machine and cutter is provided in which a foundation sheet is fed over a sanding drum which merely coats the under side with grit, slate, talc, or whatever material it may be desired to use. This may be applied in various designs or patterns and with very gay colors if desired, but its primary object is to thoroughly coat the under side of the foundation sheet. The cutting referred to may be accomplished by means of pressure, the sheet being pressed on the sanding drum with sufficient pressure to embed the particles carried by the drum, as hereinafter described. In the same machine cutting rollers may be provided between which another sheet is fed and which cut said other sheet into stencils, designs, strips, slabs, or individual units as may be appropriate to the preferred roofing. Still another series of cutting rollers may be mounted beyond the first series, and still another sheet fed thereto for similar purposes.

After passing the cutting rollers, the sheets referred to may be passed to deflectors, which will be described hereinafter. Said sheets may be deflected upward or downward for the purpose of separating the various units or parts, the purpose of so deflecting these units or parts being (1) to create room for freer movement of the respective parts in distribution; (2) to permit interweaving; (3) to provide for alternating design parts. If preferred, the strips, after leaving the cutting rolls, may be spread as they proceed to increase the distance between them until they are spaced apart and suitably form a roofing sheet with strips in bas-relief, the spacing of the strips varying, say, from one-eighth of an inch to any distance required. In this section of the machine there may be upper and lower spacing units, so that strips of different colors may be alternated in position by progressive spreading and then joined together.

If preferred, individual units, parts, or designs may be placed on the foundation sheet in prearranged space relation. Said parts may be fed to the foundation sheet by one or more moving belts. One or more of said belts may feed said units onto revoluble platforms suitably arranged to receive them, whereby said parts may be delivered to the foundation sheet with any predetermined angular spacing. Said platforms may deliver said units into receptacles which are adjustable in position and which are properly spaced to receive said units. Raised fingers may be provided on said belts appropriately to the design of unit or part to be carried, whereby the units are distributed at predetermined intervals on the foundation sheet. By reason of this construction, which will be referred to more in detail hereinafter, stencils may be mounted in position on the foundation sheet in continuous sheet form. Figures may be so arranged that they insert themselves in the proper parts in the stencils so as to keep the stencil, or cut portion, traveling in a uniform manner, whereby absolute and positive positioning of the stencils is provided for. Various modifications of deflectors and belts may be provided whereby sheets cut in continuous strip design may be properly deflected, guided, interlaced, or interlaid upon the foundation sheet.

After the upper parts or units are laid upon the foundation sheet, the material may be passed through pressing rollers which press the combined parts to secure adhesion and uniformity. A series of slitting knives may be provided adapted to operate against the under side of the sheet or in combination with knives placed above the sheet in order to create separations of the finished product into its component parts should it be desired to so separate. Furthermore, it is within the contemplation of the present invention to provide cutting means for cutting transversely of the sheet.

Instead of applying the units or shingles directly to the foundation sheet, they may be packed together in such a manner that the finished surfaces will be back to back, the purpose being to prevent the finished surfaces from coming in contact with the mica coated or unfinished portion of the back and soiling the surface thereof. In order to perform these packing operations, a tilter may be provided adapted to tilt a unit either backward or forward as delivered by the cutters. When tilted backward, the unit or shingle slides to the receptacle to which it is to be gathered, with its base part up. When tilted forward, it slides the receptacle with the finished part upward and the base part downward, so that the receptacle gathers the units face to face and finished surface to finished surface. This tilting arrangement is also important in the production of roofing pieces with a lasting mastic base, as it will deliver the pieces always with the mastic surfaces together.

If desired, slitters may be provided by means of which one of two superimposed members will be slitted, leaving the other uncut, and special rollers may be provided for rolling areas of material, leaving adjacent areas unrolled.

In order that the invention may be fully understood, an illustrative embodiment of its several features, together with some modified embodiments of some of its said features will now be described in detail, reference being had to the accompanying drawings, in which—

Figure 1ª is a diagrammatic view illustrating the principles of all but the extreme left-hand portion of Figure 1, certain structural details being omitted for clarity of illustration.

Figures 4ª, 4ᵇ, and 4ᶜ are detail views of parts of Figure 4.

*Apparatus for applying grit to the sheet prepared to receive it, either in plain uniform color or in various designs*

The processes employed in the manufacture of plain and designed roofing would embody certain functions of the ordinary roofing equipment with such modifications as described below.

Figure 1:
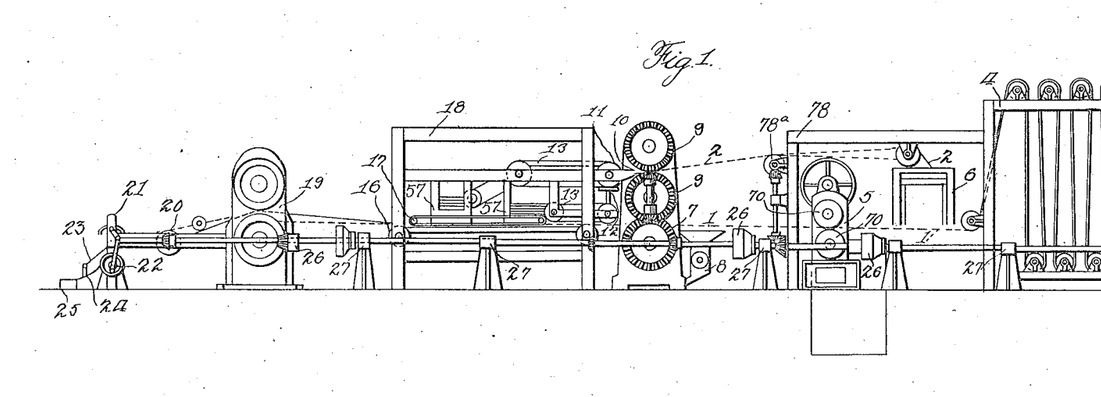
Figure 1 is a side elevation of the complete machine for use in carrying out the described method of preparing improved roofing and wallboard.
Figure 35:
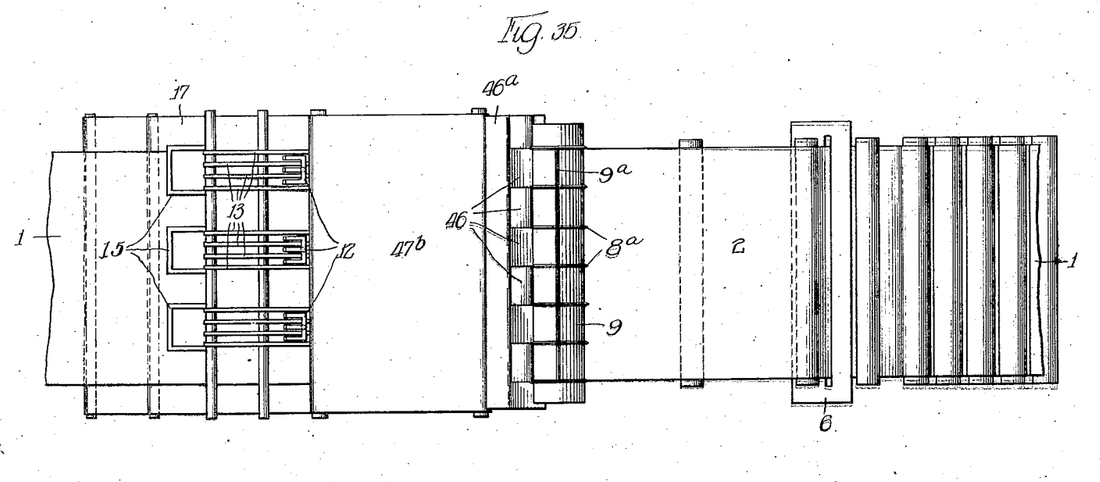
Figure 35 is a plan view of the diagrammatic showing in Figure 1ª, certain structural details being omitted for clarity of illustration.

The saturated felt 1, Figures 1, 1ª and 35 is spread on the mounted framework 4 in loops over proper guiding rolls arranged to carry it forward into the coating machine 5, where it passes between rollers 70 and receives on either side an asphalt coating in a heated state. The sheet then passes to the sanding machine, as at 7 (more clearly shown in Figure 4) where the grit fed into the receptacle 8, as shown at 38, travels to the receptacle 39, where it is picked up by wheel 71. Wheel 71 is preferably made of two segments 35, having blades 72 mounted thereon in position to protrude through the slots 37 of the wheel 71 (see Figures 4ª and 4ᵇ). These blades are mounted so that they can be permitted to recede through the slots, and leave a solid body of grit exposed to the pressure of the roofing sheet. As soon as a blade escapes this pressure by the revolution of the wheel, the blade springs back into place and continues around gathering up a fresh supply of grit.

The roofing sheet may be treated in the same fashion on the upper side, as roofing sheets usually are treated, or it may be permitted to continue in a mastic state through the pressing rolls across the belt shown at 16, Figure 1, and between the pressing rolls shown at 19, Figure 1; then continued over the slitting and cutting rolls at 20 and distributed into receptacles at the packing apparatus shown at 21. The packing apparatus is shown in detail in Figure 14, where it receives the shingles after they are cut to size. As each shingle passes between the arms 64, the tilter presses the shingle either forward or backward, and alternates the shingles so that they slide down either forward as shown at the left side of Figure 14, and drop into the receptacle 25 with the weather side up, or backward, weather side down, along the chute 24 to the receptacle 25. This tilting is done by the arm arrangement mounted on a gear or pulley as at 22, which tilts the fingers 21 backward and forward and permits the roofing to stack up weather side to weather side and back to back.

*Manufacture of striped roofing or wallboard in bas-relief*

Figures 4, 4A, 4B, 4C, 5:
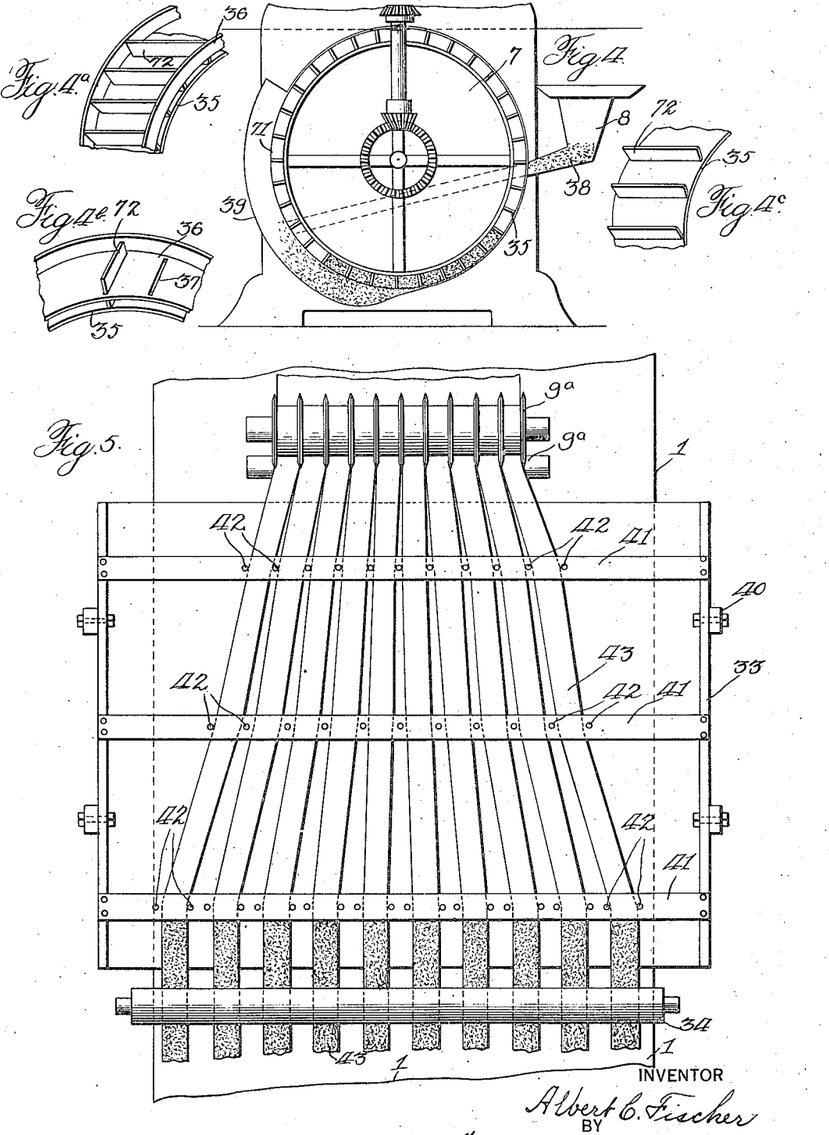
Figure 4 is an enlarged detail view in side elevation of the sanding arrangement shown in Figure 1, (the outer gearing and the intervening framework being removed), for sanding or placing grit on the under side of a waterproof sheet after it has passed through the coater and while the asphalt is in an adhesive state.
Figure 5 is a view of the spreader board shown in Figure 2 receiving the strips produced by slitting a sheet and spacing them apart to produce striped roofing, when applied to the under sheet.
Figure 6:
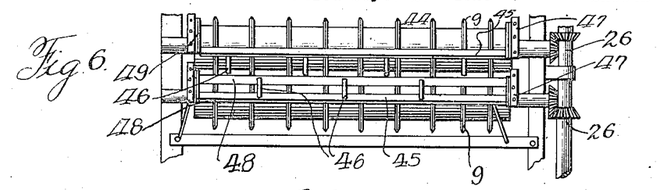
Figure 6 is a detail perspective view of the two cutting drums, the cutters, the deflectors, and the upper and lower sliding shelves, shown in Figure 1, and illustrate how the partially finished sheet is disposed of when being formed into shingles or strip roofing or when sections of the cut upper surface are necessary to form designs in combination with the base or foundation sheet in order to effect roofing in bas-relief.

In Figures 1, 1ª and 35 of the drawing, the framework 4 with its traversed rollers constitutes the cooler for a saturated sheet 1. This sheet feeds into the coater at 5, receives an asphalt coating, and passes on to the sander at 7 where it receives a coat of grit or sand on the under side. A machine 6 may issue a second web 2 of material containing grit, which passes under the framework 78 of Figure 1, over the roller 78ª thereof and between cutters 9, 9, where it is cut into strips. The frame work 18 of Figure 1 may contain the receptacles 15 and belts 13, as illustrated in said figure, or, instead, may be provided with the spreader board 33 illustrated in Figures 2 and 5. The details of this spreader board are shown in Figure 5. From the cutters 9, 9 which divide the sheet 2 (Figure 1) into strips, the strips pass between pins 42 mounted in framework 41, and as they continue on down the spreader board, they are received by the various cross-strips 41 and further separated until the proper spacing is secured, when they leave the spreader board and pass under a pressing roll 34 (Figure 5) which presses them on to the mastic sheet as at 1 (Figure 5), joining the strip roofing to the solid sheet and forming striped roofing.

The combined sheet then passes on to the pressing rolls 19 where it is further pressed, and is then fed on to the table, from which point it is either cut into shingles or sheets, or made up into rolls.

*Manufacture of offset shingles in single or multiple units or strips and block effects in wallboard*

If preferred, two layers of wall board material may be fed from frame work 4, which will take the same course as the single foundation sheet referred to above.

In the manufacture of roofing, the framework 4 remains as shown in Figure 1, the saturated felt being cooled in loops as shown at 1 in frame 4, and passed to the coater 5, between coating rolls 70—70, and from the coating rolls over the sander as at 7, which applies a grit to the under surface, the upper surface as it proceeds being coated by the coating machine at 5.

Figure 7:
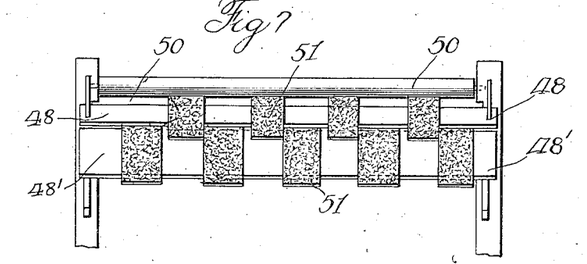
Figure 7 shows in elevation the delivery side of the upper and lower shelves over which the pieces pass after being deflected from the cutting drums.

The second web of roofing 2 coming from the machine 6, passes on to framework 78, and over rolls 78ª to cutter rolls 9, 9 which separate it into various shingle effects or various pieces of different design. These pieces, as they leave the cutting rolls 9, 9, are deflected upward or downward, as may be necessary, by the fingers 46—46 mounted on bases 45, 45, which are actuated by suitable mechanism 47 for imparting a rotary or oscillatory movement thereto whereby alternate shingles are directed upward and downward as they are fed from the cutters 9. After being deflected, the pieces pass over either the upper shelf 48 or the lower shelf 48'; that is, those deflected upward pass over the upper shelf and those deflected downward over the lower shelf as shown in Figure 7 at 51, the roll 50 serving as a feeding roll.

Figures 1A, 9, 33, 34:
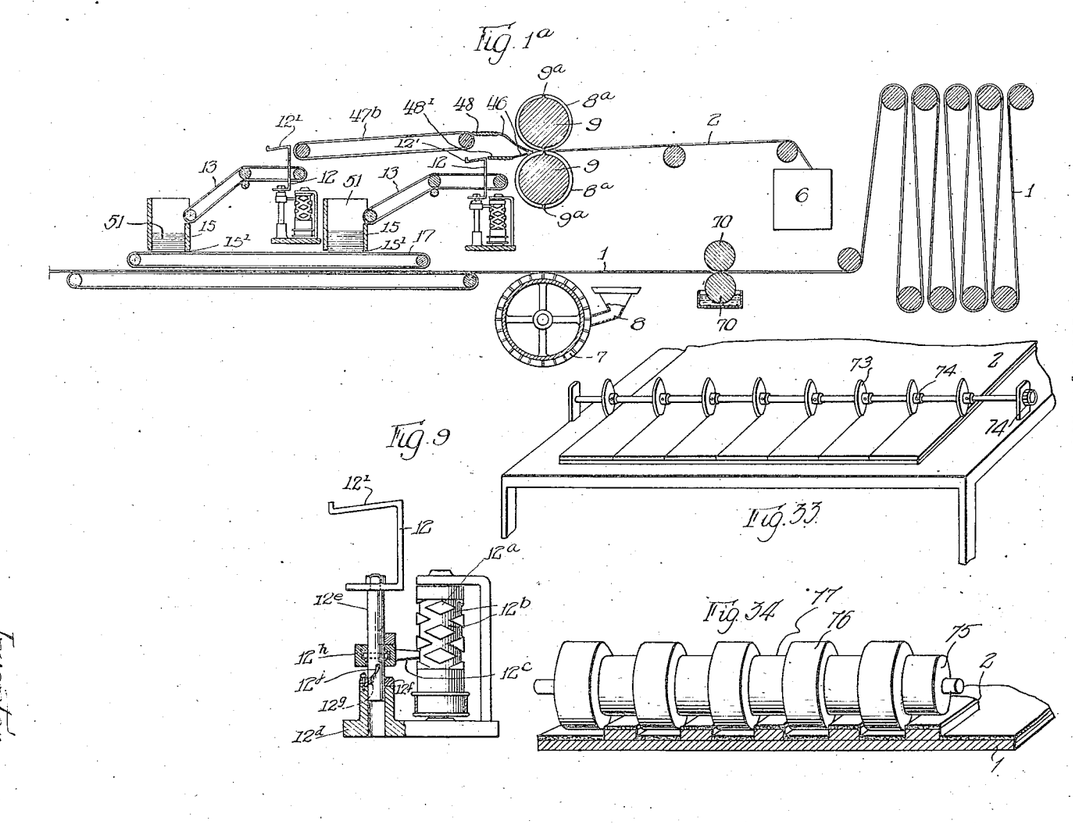
Figure 9 illlustrates a mechanical movement in cooperation with the trays shown in Figure 8 for communicating the necessary movement to said trays.
Figure 33 represents an over-slitter which can cut through both sheets or only through the upper part of the double layer according to the space between the cutting edges and the surface upon which the sheet is supported.
Figure 34 represents a special pressing roller to roll in the grit on the upper surface, from which asphalt has been left off in certain sections, so that when binding the two sheets together they may separate in offset relation.

This deflecting mechanism may be in the form of alternate inclines 46 of the type shown in Figure 1ª, the only purpose being to place alternate pieces one on the upper tray 12 and one on the lower tray 12. These pieces are received by tray 12 or belt 47ᵇ as the case may be (Figures 1ª and 9), the trays being mounted with a screw and cam action so that they may be regulated to turn and reciprocate vertically, the pieces received to any position which may be necessary and deposit them on belts 13. Only one set of trays is shown in Figure 1, though it will be understood that the number of sets of trays may be chosen as desired. Figure 1ª shows two sets of trays.

Figure 8:
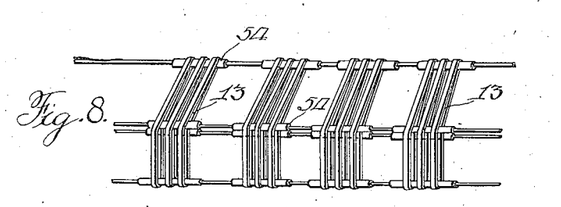
Figure 8 illustrates the method by which the belts carry the pieces from the trays and guide them in proper position to the recepticles.
Figure 10:
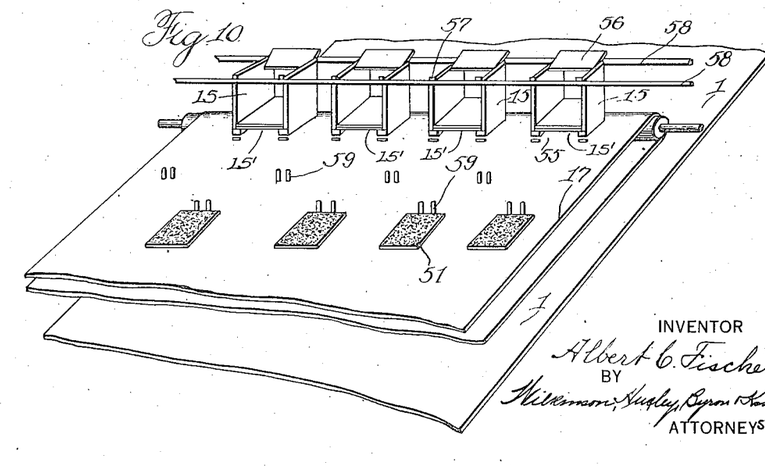
Figure 10 is a perspective view of the receptacles which receive the pieces or plates of roofing which are arranged to make up shingle designs and shows how the shingles are received and stacked in layers so that a belt, containing projections, can engage a bottom-most piece, slide it into proper position, and carry it forward to the position of Figure 11.

When the trays have dropped the necessary distance and turned the pieces in the proper position, the pieces are picked up by belts as at 13, (Figure 8), which carry the pieces forward and deposit them in receptacles shown at 57 (Figure 10). Referring to Figures 1ª, 8 and 9, it will be noted that the trays 12 have a single upright mounted between the runs of the composite belt 13 and through the mechanical movement hereinafter described, is capable of vertical reciprocation and oscillation on its vertical axis. Also that the tray has angularly disposed arms 12' which dip between the runs of the belt in its lowest position to cause the belt to slide the shingle piece off of the trays. The movement is so timed that the forward end of arms 12' always fit between the runs of the belt 13 in its lowermost position, the angular movement taking place above the belt or in the receiving position. The pieces are then stacked in the receptacles for further distribution by the belt 17 which has mounted thereon gripping fingers 59, so placed as to take the shingles from the receptacles 57 and projecting through the opening 15' in the bottom, carry them forward in front of the fingers in the proper position which they are finally to assume on the foundation sheet 1.

Figure 11:
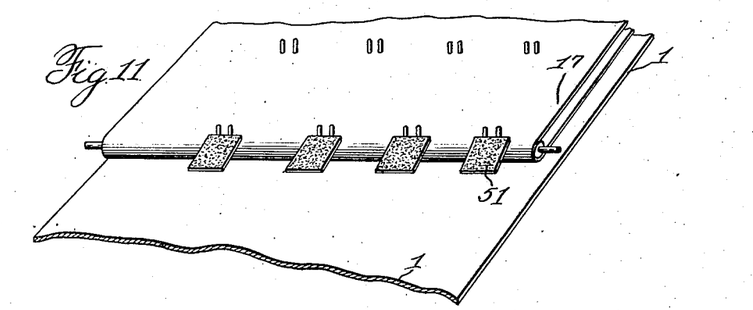
Figure 11 illustrates how the belt feeds the pieces onto the foundation sheet and places the pieces in their proper positions.
Figure 12:
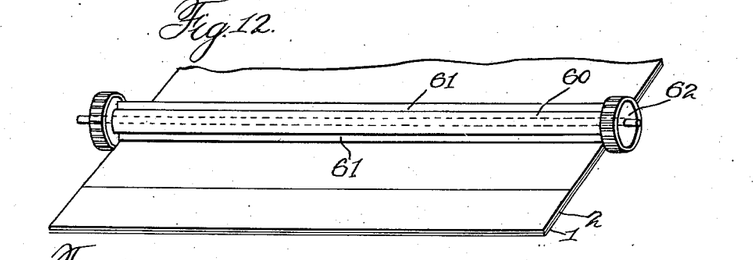
Figure 12 illustrates the cross cutters which cut the roofing sheet crosswise. These cutters may be either of the rotary type or of the vertical type which operate in a straight channel.

The receptacles 57 are adjustable in any direction, and are left open at the bottom as at 15' so that one of the pieces can be removed readily by the fingers mounted on belt 17. From the bottoms 15' of receptacles 15 the pieces are distributed on the foundation sheet as shown in Figure 11, and as the belt 17 moves at the same speed as the base or foundation sheet 1, the pieces retain their positions and are located accurately on the foundation sheet. The foundation sheet with the shingles 51 mounted thereon continues and it may be rolled up on a suitable spool for shipping or be caused to pass forward underneath cutters as at Figure 12, in which 61 represents cutting blades, 62 the gear by which the blades are worked, and 60 the receiving axle for the blades, which it is understood my be mounted in any manner.

Figure 13:
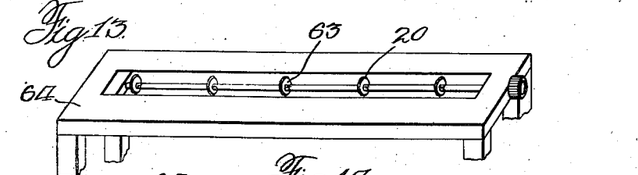
Figure 13 illustrates the arrangement of the under cutters which separate the underlying foundation sheet at points where no asphalt has been deposited, and leave the remaining overlying shingles, strips, or pieces in an offset relation to the foundation sheet.
Figure 17:
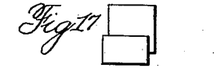
Figure 17 illustrates an individual offset shingle.
Figures 18, 19:
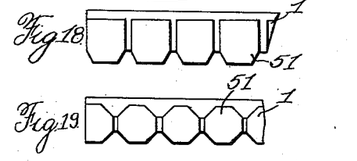
Figure 18 shows a modified shingle strip with shingles having truncated overhanging ends arranged upon the base sheet.
Figure 19 shows a shingle strip with octagon-shaped shingle units placed in an offset relation on the foundation sheet.
Figure 20:
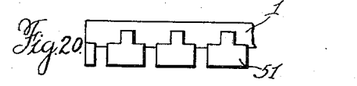
Figure 20 shows shingles of T-shape, developing tabs and placed in an offset relation.
Figure 21:
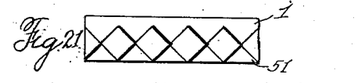
Figure 21 indicates a diamond shaped shingle mounted on the foundation sheet in offset relation.
Figure 22:
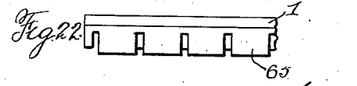
Figure 22 shows a continuous shingle strip mounted on a foundation sheet in offset relation.
Figures 23, 24, 25:
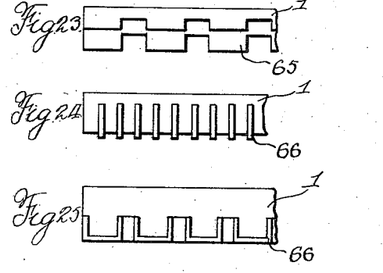
Figure 23 shows a construction embodying the principle of Figure 22, with widened slots.
Figure 24 shows a construction embodying the continuous strip principle, but in which separate strips are mounted on the foundation sheet to form the striped effect.
Figures 25 illustrates how the Grecian border design may be formed in bas-relief in combination with a foundation sheet.
Figure 26:
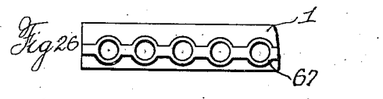
Figure 26 illustrates a cut design mounted on a foundation sheet.
Figure 27:
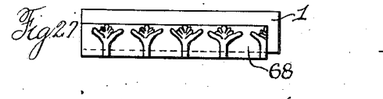
Figure 27 shows a pressed or molded upper surface united with the foundation sheet.
Figure 28:
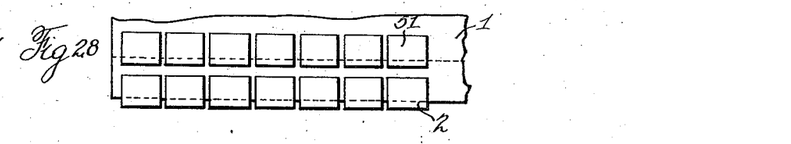
Figure 28 indicates the cutting line upon which the undersheet is secured when developing continuous strips bearing shingles.
Figure 29:
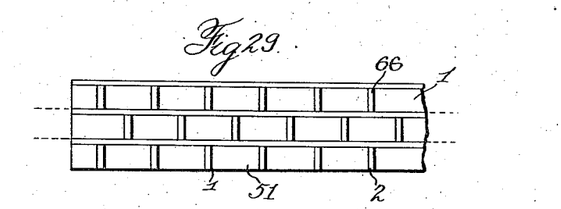
Figure 29 illustrates an embodiment of the invention, according to which narrow strips are mounted on the roofing sheet, and the sheet is then cut along a line that will allow for overlapping of the sections.
Figure 30:
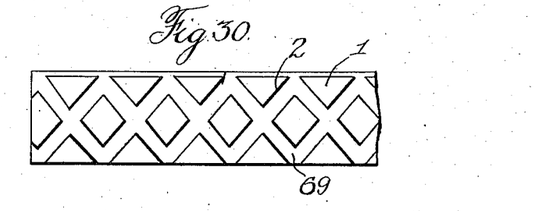
Figure 30 illustrates a combination of the foundation sheet and a bas-relief sheet of material guided in an unseparated state upon the foundation sheet, and secured thereon to develop the pattern merely by its outline, or to have exposed portions of the foundation sheet eliminated from view by filling in the pattern with portions of contrasting material, for instance, portions cut from a third sheet of a different color.
Figure 31:
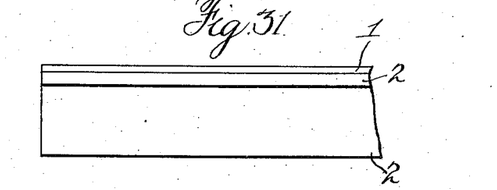
Figure 31 illustrates an embodiment of the invention according to which the foundation sheet has narrow and wide strips of material mounted thereon, permitting the overlapping relation, and producing a color stripe directly next to the overlapping or fastening edge of the second sheet.
Figure 32:
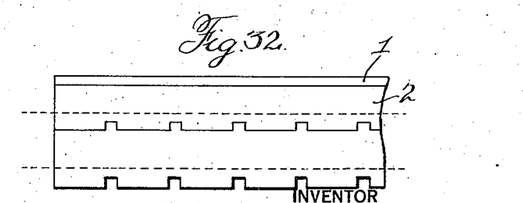
Figure 32 illustrates an embodiment of the invention according to which a continuous strip which has slots cut therefrom, is mounted on a foundation sheet in such a manner that the base sheet can be separated by splitting the slotted edges or tabs projecting beyond the foundation sheet.

From this point, if shingles are desired, the sheet proceeds to a series of slitters as shown in Figures 13 and 33, they being "under" and "upper" slitters respectively, for the reason that they only penetrate one of the two thicknesses of material presented from the machinery above described. These may both be employed at once, in which case the shingles will be formed either cut longitudinally through the entire thickness on the same line or in staggered relation, as shown in Figure 17.

In the event shingles are not wanted, the transverse strips of roofing thus formed may be taken from the end of the machine by an operator or any suitable mechanism and packed in a manner ready for shipping.

Figure 14:
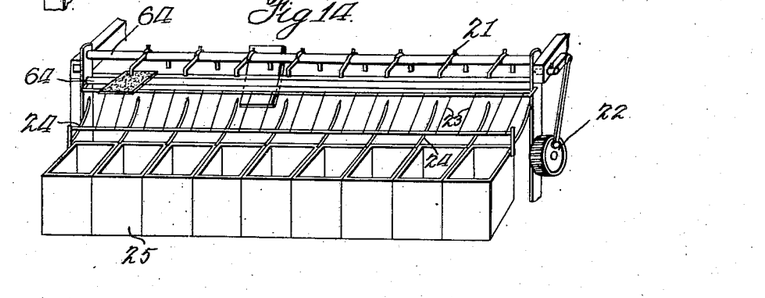
Figure 14 illustrates means for packing the roofing when cut up in shingle form, with the grit surfaces face to face, and the sides which usually are laid to the roofing also face to face; namely, by tilting the shingles forward or backward, and depositing them weatherside up or down in the receptacles.
Figure 15:
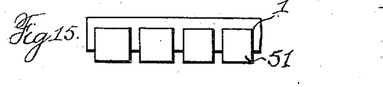
Figure 15 illustrates a shingle strip wherein the shingle-forming portion has been slit to allow the shingles to assume an offset and spaced relation.
Figure 16:
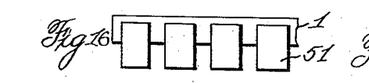
Figure 16 illustrates a similar shingle strip with a longer shingle and greater offset and spacing.

When shingles are formed they proceed to the apparatus as shown in Figure 14, where they may either move forward in the regular manner by suspending the operation of tilters as at 21 and permitting the shingles to slide into the receptacles 25, or they may be packed base to base and weather side to weather side by placing the tilting arrangement in motion as before described.

Should the shingles be mounted in strips on the foundation sheet, the machine may be so set that any sized strip can be cut and the under-slitters will sever the base sheet at any desired point, thus enabling one to secure an offset condition on the upper layer as related to the foundation sheet.

The structure above referred to for depositing the subdivisions of a superposed sheet upon the foundation sheet is shown diagrammatically in Figure 1. A mechanical movement for communicating a raising and lowering and turning movement to the trays 12 is shown in Figure 9. It will be clear from the description appearing above that the foundation sheet 1, after being cooled in the loops at the right-hand end of the figure, is coated by the coating rolls 70—70, after which said foundation sheet is sanded by the sander 7. Said foundation sheet as it travels to the left as shown in Figure 1ª will have units deposited thereon by the belt 17 in a manner which will now be briefly referred to. The superposed sheet 2, whose subdivisions (herein called units) are to be deposited upon the foundation sheet, is passed from the machine 6 to the cutter rolls 9—9. Said cutter rolls 9—9 are provided with circumferential cutting edges 9ª and with transverse cutting edges 9ᵇ which subdivide the sheet 2 into subdivisions or units.
The fingers 46—46 divert said units (indicated in Figure 7 by the numeral 51) upwardly and downwardly to the shelves 48—48′. From the shelf 48′, the units 51 pass to the adjacent trays 12. From the shelf 48 shingles or units may be carried by the belt 47ᵇ to another tray 12. Said trays, as shown in Figure 9, are adapted to cooperate with the multi-cord belts 13—13, shown in Fig. 8. When said trays 12—12 are lowered, the shingles carried thereby will be lifted therefrom by said belts 13—13 and carried to the left. Means for communicating a reciprocating vertical movement to the trays 12—12 may be chosen as desired, a well known mechanical movement for accomplishing such rectilinear reciprocating movement being shown in Figure 9. Said mechanical movement comprises the rotating shaft 12ª having the reversely cut threads 12ᵇ—12ᵇ. Rotary motion may be communicated to the shaft 12ª by any preferred means such as a belt. Positioned in the reversely cut thread 12ᵇ is the finger 12ᶜ forming part of the collar 12ʰ rotatably mounted upon the rotatable shaft 12ᵉ carrying the tray 12. Said collar 12ʰ is rotatable relative to the shaft 12ᵉ. Secured to the base 12ᵈ is the second collar 12ᶠ having the tooth 12ᵍ fitting into the spiral slot 12ʲ of the shaft 12ᵉ. It will be clear that rotary movement in a continuous direction of the shaft 12ª will cause the finger 12ᵉ and collar 12ᵈ to reciprocate vertically. By reason of the fact that the collar 12ᶠ is secured to the base 12ᵈ, and by reason of the engagement of the tooth 12ᵍ in the spiral slot 12ʰ, an oscillatory motion will be communicated to the tray 12. The amount of oscillatory movement may be chosen by changing the design of the slot 12ʰ. It will be clear that when any one of the trays 12 is lowered, the corresponding belt or conveyor 13 will pick off a unit which may be disposed upon the top of said tray 12 and carry said unit to the left as viewed in Figure 1ª. No novelty is claimed for the mechanical movement referred to, inasmuch as such movements are old and well known.

The belts or conveyors 13—13 will carry the units 51 to the corresponding receptacles 15—15. Said units 51—51 are removed from the bottom of said receptacles by means of the fingers 59 in the manner shown in Figure 10. As referred to above, the belt 17 carrying the fingers 59—59 will deposit the units 51 on the foundation sheet.

Manufacture of inlaid design roofing or wallboard

Figures 2, 3:
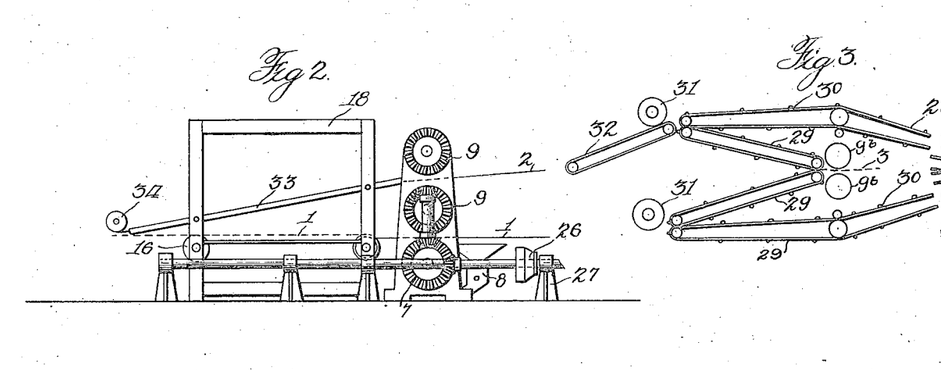
Figure 2 is a side elevation of an apparatus by which striped roofing is manufactured in bas-relief, with the stripes placed either close together or with spaces between them.
Figure 3 is a side elevation of a conventional arrangement of belts utilized in carrying the strips, either plain or stencil cut, and in which the strips first travel along separate belts and are later united to form either roofing in bas-relief or inlaid roofing; the system of conveying being adapted for use in conveying either lighter or heavier grades of roofing and in conveying various parts when cut; also in conveying special strips so alternated that the roofing, when said strips are united, will have a foundation sheet with thin layers and thicker layers alternating or intermingling.

In the manufacture of inlaid or design roofing, the apparatus shown in Figure 3 is utilized, which shows a novel arrangement of belts containing gripping fingers which enable the belts to take hold of the design roofing at certain intervals in order to maintain proper register of various sheets of roofing so that they will accurately fit one into another when brought together.

According to the disclosure shown in Figure 3, I have represented diagrammatically an additional machine which may be substituted for the frame 18 in Figure 1 so that the upper sheet to be formed and applied to the foundation sheet 1 may be of an inlaid type rather than of a shingle formation. When the apparatus shown in Figure 3 is employed, the blades on the cutting rolls 9 are such that a design of suitable kind is cut by forming cut out pieces and a skeleton of the web. This sheet is shown at 2 (Figure 3), in which case the skeleton portion travels upwardly on belt 29 and the cut out parts keep their relative spacing and travel downwardly on the lower adjacent belt 29. Positioned between the belts 29 and 29, above mentioned, is a second supply of roofing web material similar to web 2 but preferably of a different color. Web 3 is cut by rolls 99 (Figure 3) at a predetermined time interval with the cutting action of the web 2 and of a complementary pattern thereto. The skeleton portion of web 3 passes downwardly carried by the lowermost belt 29 adjacent thereto, whereas the cut out pieces travel upwardly on the upper adjacent belt 29. At the upper part, the upper skeleton of web 2 is caused to overlie and register with the cut out portions of web 3, this being effected by the timing of the cutting operation for webs 2 and 3, and the registered parts are caused to interfit by the pressing action of the roll 31 and the conveyor 32. The same operation takes place at the lower roll 31, whereby two inlaid webs are formed of opposite coloring. One may be applied to each of two sheets 1 supplied as from the frame 4, as described in the first part of the specification, or one may be rolled up or conveyed away while the other is placed in superposed relation on the foundation sheet 1 which passes thereunder, as shown in Figure 1.

Roofing may be manufactured with stripes in bas-relief by following the same procedure as that described above for making striped roofing, using two sheets 1 and 2, of which the sheet 2 is free from grit on either side, cutting sheet 2 into strips as before described, then passing the composite sheet through a gritting device, as is customary in the manufacture of roofing, and then passing it between rollers as at Figure 34, which gives a uniform appearance over the entire roof, except that the strips mounted thereon are in elevation and as in contrast to the foundation sheet, although both surfaces are covered with grit (either the same or different color), but the edges of the upper strip retain the black color natural to asphalt, making a thin black outline along the sides of the strips.

It may be readily understood that the sheet No. 2 may be conveyed through pressing rolls or dies while free from grit, and the impression of the dies or molds made thereon, after which they may pass through the various operations and be mounted on the foundation sheet so that the design may be impressed thereon in bas-relief, developing any pattern or design according to the variation in the design molds or rollers.

With the apparatus above described, it is obviously possible to carry on the manufacture of roofing or wallboard with design in bas-relief produced from a cut design in which the pattern is divided and each section mounted separately on the foundation sheet.

In practicing the invention, the surface of the sheet 2 may contain grit or be plain as is desired. It can readily be seen that the combination of machine parts may be utilized to manufacture almost any kind or description of roofing, when used in the novel combination as outlined.

I claim:

1. In an apparatus for the manufacture of sheet surfacing materials, means for feeding a foundation sheet, means for feeding a sheet the subdivisions of which are to be superposed thereon, and means for dividing said second sheet and delivering its subdivisions to said foundation sheet, the last named means comprising cutters adapted to subdivide said second sheet and means adapted to receive and space the separated parts at predetermined angles and apply them in predetermined spaced relation upon the foundation sheet.

2. In an apparatus for the manufacture of sheet surfacing materials, means for feeding a foundation sheet, means for feeding a sheet the subdivisions of which are to be superposed thereon, and means for subdividing said second sheet and delivering its subdivisions to the foundation sheet; said last-named means comprising cutters, and separating and distributing means acting upon the subdivisions produced by said cutters and directing them in spaced relation to the foundation sheet.

3. In an apparatus for the manufacture of sheet surfacing materials, means for feeding a foundation sheet, means for feeding a sheet the subdivisions of which are to be superposed thereon, and means for subdividing said second sheet and delivering its subdivisions to the foundation sheet; the last-named means comprising cutters adapted to subdivide said second sheet in the direction of its feed, both on lines longitudinal to the feed and on lines intersecting said longitudinal lines, and means adapted to receive and space the separated parts and apply them in spaced relation upon the foundation sheet.

4. In an apparatus for the manufacture of sheet surfacing materials, means for feeding a foundation sheet, means for feeding a sheet the subdivisions of which are to be superposed thereon, and means for subdividing said second sheet and delivering its subdivisions to the foundation sheet; the last-named means comprising cutters adapted to subdivide said second sheet in the direction of its feed, both on lines longitudinal to the feed and on lines intersecting said longitudinal lines, and means adapted to receive and space the separated parts and apply them in spaced relation upon the foundation sheet, comprising receptacles adapted to receive the parts and means for removing the parts individually from said receptacles successively and delivering them to the foundation sheet.

5. In an apparatus for the manufacture of sheet surfacing materials, means for feeding a foundation sheet, means for feeding a sheet the subdivisions of which are to be superposed thereon, and means for subdividing the superposed sheet and distributing in predetermined relation its subdivisions to the foundation sheet; the last-named means including means for pressing the material of the superposed sheet upon the foundation sheet.

6. In an apparatus for the manufacture of sheet surfacing materials, means for feeding a foundation sheet, means for feeding a sheet the subdivisions of which are to be superposed thereon, and means for subdividing the superposed sheet and distributing in predetermined relation its subdivisions to the foundation sheet and means for surfacing said sheets.

7. In an apparatus for the manufacture of sheet surfacing materials, means for feeding a foundation sheet, means for feeding a sheet the subdivisions of which are to be superposed thereon, and means for subdividing the superposed sheet and distributing in predetermined relation its subdivisions to the foundation sheet and means for applying a weather-surfacing material to the subdivisions of the superposed sheet.

8. In an apparatus for the manufacture of sheet surfacing materials, means for feeding a foundation sheet, means for feeding a sheet the subdivisions of which are to be superposed thereon, and means for subdividing said second sheet and delivering its subdivisions to the foundation sheet and means for subdividing said foundation sheet along lines related to the edges of the parts of e superposed sheet, comprising cuttin knives adapted to penetrate through the f ndation sheet without severing the parts superposed thereon.

9. In an apparatus for the manufacture of sheet surfacing material, means for supplying a foundation web, means for supplying a web of material the subdivisions of which are to be superposed thereon, means for subdividing said web into pieces embodying different designs, and means for separating the pieces of one design from those of another, and separately applying them to the foundation sheet.

10. In an apparatus for the manufacture of sheet surfacing materials, means for feeding a web of material with adhesive upon the surfaces thereof, means for applying a weathering material to one of the adhesive surfaces of said web while maintaining the other surface in adhesive state, means for subdividing the web so developed to produce pieces of roofing material, and means receiving said pieces and delivering them with their weathered and adhesive surfaces presented alternately in opposite directions.

11. In an apparatus for the manufacture of surfacing material, means for feeding a web of material, means for treating the surfaces of said web, means for subdividing said web into pieces of roofing material, means for stacking subdivisions of such material, and means for feeding said subdivisions individually from said stacks.

12. In an apparatus for the manufacture of sheet surfacing material, means for feeding a foundation web, means for feeding a web of material the subdivisions of which are to be superposed upon the foundation web, means for subdividing said second web into individual pieces, and means for applying said individual pieces in spaced relation upon the foundation web, comprising a feeding apron traveling synchronously with the foundation web in receiving relation to the subdivisions of said second web, and having fingers symmetrically disposed thereon which pick up the individual subdivisions and, by timing their path of succession, determine their spacing upon the foundation web.

13. In an apparatus for the manufacture of sheet surfacing material, means presenting a foundation web, means presenting a web of material the subdivisions of which are to be superposed thereon, means slitting said second web into sections, and distributing means for spacing the sections so produced and directing them to the foundation web in their spaced relation.

14. In an apparatus for the manufacture of sheet surfacing material, means presenting a foundation web, means presenting a web of material the subdivisions of which are to be superposed thereon, means slitting said second web into sections, and distributing means for spacing said sections so produced and directing them to the foundation web in their spaced relation and means for surfacing said sections with weathering material.

15. In an apparatus for the manufacture of sheet surfacing material, means for delivering a foundation web, means for delivering a web of material the subdivisions of which are to be superposed upon said foundation web, means for subdividing said second web into individual pieces for developing a pattern upon the foundation web, and means receiving the pattern pieces and rotating them to determine their angular positions upon the foundation web.

16. In an apparatus for the manufacture of sheet surfacing material, means for delivering a foundation web, means for delivering a web of material the subdivisions of which are to be superposed upon said foundation web, means for subdividing said second web into individual pieces for developing a pattern upon the foundation web, and means receiving the pattern pieces and rotating them to determine their angular positions upon the foundation web; said last-named means comprising rotary trays in the paths of the pieces, and means for imparting rotation to said trays.

17. In an apparatus for the manufacture of sheet surfacing material, means for supplying a plurality of webs of material and superposing one upon the other, and cutters adapted to cut the respective plies of material without penetrating the other ply or plies, and located in offset relation one to another so that the severed plies of material will remain in overhanging relation one to the other.

Signed at Chicago, Illinois, this 18th day of September, 1920.

ALBERT C. FISCHER.